United States Patent [19]

Lee

[11] Patent Number: 5,469,212
[45] Date of Patent: Nov. 21, 1995

[54] APPARATUS FOR COMPRESSION-ENCODING AND DECODING VIDEO SIGNALS

[75] Inventor: Choon Lee, Seoul, Rep. of Korea

[73] Assignee: Goldstar Co., Ltd., Seoul, Rep. of Korea

[21] Appl. No.: 43,370

[22] Filed: Apr. 6, 1993

[30] Foreign Application Priority Data

Apr. 11, 1992 [KR] Rep. of Korea .................... 6061/1992

[51] Int. Cl.[6] .................................................... H04N 7/48
[52] U.S. Cl. ......................... 348/392; 348/409; 348/412; 348/424
[58] Field of Search ..................................... 348/392, 409, 348/412, 415, 419, 424; H04N 7/137

[56] References Cited

U.S. PATENT DOCUMENTS

4,884,136  11/1989  Ninomiya ................. 348/392

*Primary Examiner*—Howard W. Britton
*Attorney, Agent, or Firm*—Fliesler, Dubb, Meyer & Lovejoy

[57] ABSTRACT

An apparatus for compression-encoding and decoding digital video signals, capable of additionally transmitting a differential signal indicative of a difference between an original video signal and an encoded video signal obtained by encoding the original video signal by an existing video compression system, so as to efficiently cope with a varied bandwidth of a recording medium or a channel. The apparatus comprises an encoding device for encoding an original digital video in a sampling manner, encoding a differential signal indicative of a difference between each of the original video signals and a signal obtained by expanding each corresponding one of the encoded original video signals, together with edge information, adding the encoded composite differential signal to the encoded original video signal, and outputting the resulting signal. The apparatus also comprises a decoding device for decoding each of the encoded original video signals, reading video signals, indicative of video portions including no differential signal, from video signals resulting from the decoding of the encoded original video signals, based on the edge information, adding each of the differential signals to each corresponding one of the read video signals, and outputting recovered video signals.

9 Claims, 6 Drawing Sheets

PRIOR ART

FIG.—1

PRIOR ART

APPARATUS FOR COMPRESSION-ENCODING AND DECODING VIDEO SIGNALS

BACKGROUND OF THE INVENTION

1. Field of the Invention

The present invention relates to an apparatus for compression-encoding and decoding digital video signals, and more particularly to an apparatus for compression-encoding and decoding digital video signals, which intends to recover fine information disappearing upon interpolating a digital video compressed by a decimation and to enable a circuit at the receiving side to be efficiently designed.

2. Description of the Prior Art

Generally, compression of digital video signals means that a great quantity of video data is efficiently converted into a small quantity of video data to meet the recording bandwidth of a recording medium or a channel, although there may be a degradation in picture quality of an original video.

As conventional video compression techniques, various coding methods have been known, which include a transform coding method, a predictive coding method, a hybrid coding method, a vector quantization method, and a sub-band coding method. Recently, such video compression techniques have been making fast progress. In particular, as they have been applicable to technical fields such as ISDNs and multimedia, international standards relating to the video compression have been continuously reported.

For example, the international standard so called a moving picture experts group (MPEG) for recording a compressed video on a digital recording medium such as a CD-ROM is currently extending.

In accordance with this MPEG standard, it is possible to achieve an encoding at a high compression ratio, using methods such as a discrete cosine transform (DCT), a motion estimation (ME) and a variable length coding (VLC).

Figure 1:
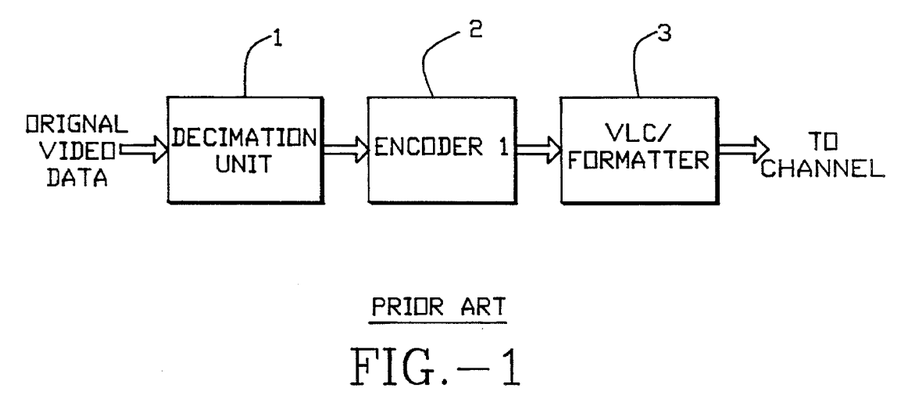
FIG. 1 is a block diagram of a conventional device for compression-encoding video signals.

Referring to FIG. 1, there is illustrated a conventional device for compression-encoding video signals. As shown in FIG. 1, the compression encoding device comprises a decimation unit 1 for reducing the amount of data for an original video in a sub-sampling manner, a first encoding unit 2 for encoding output data from the decimation unit 1 to compress it, and a VLC/formatter 3 for compression-formatting an encoded signal from the first encoding unit 2 in a VLC manner.

Figure 2:
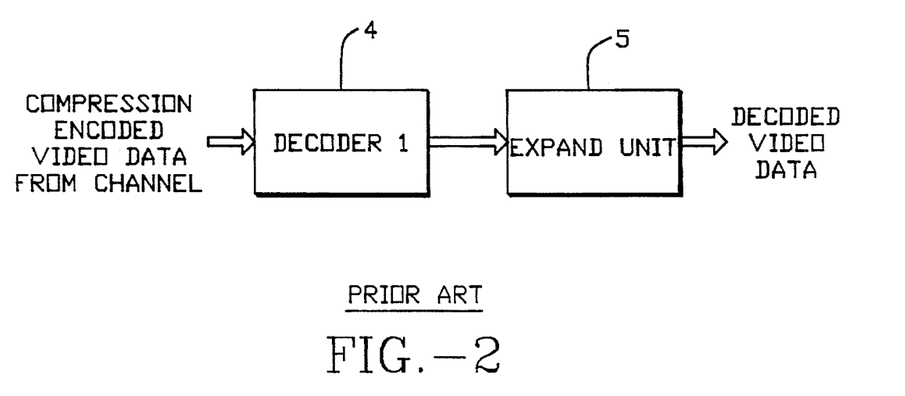
FIG. 2 is a block diagram of a conventional device for decoding compressed video signals.

On the other hand, FIG. 2 illustrates a conventional device for decoding compressed video signals. This decoding device comprises a decoder 4 for receiving compression-encoded video data and decoding it, and an expand unit 5 for expanding video data decoded in the decoder 1.

Operations of these devices for compression-encoding video signals and decoding them will now be described.

As an original digital video signal is received in the compression encoding device, the amount of data thereof is reduced in the decimation unit 1, in a sub-banding coding manner. Thereafter, the video data reduced in data amount is encoded in the first encoding unit 2 to be compressed. The compression-encoded signal is then formatted in the VLC/formatter 3, in a variable length coding manner, so as to be compressed at a higher rate. This compressed video data is recorded on a recording medium or transmitted via a transmitting medium.

On the other hand, when a signal obtained by reproducing the signal transmitted from the video signal compression encoding device or recorded on the recording medium is received in the decoding device, it is decoded in the decoder 4 and then expanded to the size of the original video signal, in the expand unit 5, so as to be recovered.

The first encoding unit 1 utilizes high technical video compression techniques, so as to transmit video data with a proper size and a proper amount within a certain limited bandwidth. For example, video compression techniques which are regarded as optimum ones for respective channels are selected in various fields such as HDTV fields, digital VCR fields, and multimedia fields.

Where a higher compression ratio is desired, in spite of a degradation in picture quality, a device such as the decimation unit 1 is used. In this case, there is used a method for reducing a video in size in the sub-sampling manner and then compressing it. When this method is used, fine information of the video disappear during when the size of video information is optionally reduced.

In cases of video data compression methods used in HDTV digital VCRs and digital broadcasting satellites (DBSs), the use of the decimation unit 1 is eliminated so that an original video subjected to no sub-sampling is compression encoded, in order to generate a video signal with a certain limited bandwidth. In this case, there are various problems relating to the data amount.

Each of the above-mentioned video data compression techniques are designed for one selected channel or recording medium. If a new application requiring a larger bandwidth is made, an optimum video data compression technique will be newly developed. However, such a video data compression technique newly developed may have no relation with the known video data compression techniques. In this case, there is a problem about a compatibility to systems using the known compression techniques. For example, it is impossible to utilize the new compression technique in systems using the known compression techniques, since a new decoding technique should be used, in order to decode a video signal encoded according to the new compression technique. Furthermore, a new system to which a new decoding technique is applied can not decode video data encoded according to the known compression techniques.

Due to such a problem about compatibility, the manufacturers need a long time for developing new systems. On the other hand, the consumers bear expenses for purchasing the systems. As a result, there is also a problem of requiring a long system replacement time for enabling a commercial use of more efficient video processing systems meeting new and larger bandwidths.

Until an optimum video compression technique is developed, it is necessary to provide compression encoding/decoding devices capable of being applied to new bandwidths and yet minimizing an alternation of existing systems, even though they exhibit a slight degradation in picture quality.

SUMMARY OF THE INVENTION

Therefore, an object of the invention is to provide an apparatus for compression-encoding and decoding digital video signals, which is capable of additionally transmitting a differential signal indicative of a difference between an original video signal and an encoded video signal obtained by encoding the original video signal by an existing video compression system, so as to efficiently cope with a varied bandwidth of a recording medium or a channel, and of having a compatibility with existing systems and yet minimizing alternations in existing devices for compression-encoding and decoding video signals, so as to enable a commercial use thereof in a short time.

In accordance with the present invention, this object can be accomplished by providing an apparatus for compression-encoding and decoding digital video signals comprising: encoding means for encoding an original digital video in a sampling manner to produce encoded original video signals, encoding a differential signal indicative of a difference between each of said original video signals and a signal obtained by expanding each corresponding one of said encoded original video signals, together with edge information, to produce an encoded composite differential signal, adding said encoded composite differential signal to the encoded original video signal, and outputting the resulting signal; and decoding means for decoding each of the encoded original video signals and each corresponding one of the differential signals encoded in said encoding means and then received via a transmitting medium or played back from a recording medium, reading video signals, indicative of video portions including no differential signal, from video signals resulting from said decoding of the encoded original video signals, based on the edge information, adding each of the differential signals to each corresponding one of said read video signals, and outputting recovered video signals.

In accordance with the present invention, the encoding means comprises a decimation unit for reducing the size of each of said original digital video signals in a sub-sampling manner, a first encoder unit for encoding each of signals subsampled by said decimation unit to video information proper to a limited bandwidth of said recording medium or said transmitting medium, an expand unit for expanding a signal from said first encoder unit up to the size of each original video signal, in reversely proportional to the reduction achieved by the decimation unit, a delay unit for delaying each original video signal for a predetermined time during which the original video signal is processed through the decimation unit, the first encoder unit and the expand unit, an adder unit for calculating a difference between each original video signal delayed by said delay unit and each corresponding expanded signal from the expand unit, a second encoder unit for encoding a differential signal from said adder unit, and a VLC/formatter unit for encoding a signal from said second encoder unit in a variable length coding and formatting it to send the resulting signal to a channel of the transmitting medium or the recording medium.

The decoding means comprises a demultiplexor unit for receiving each of said encoded video signals from said encoding means via said transmitting medium or said recording medium, demultiplexing it to separate each corresponding composite differential signal therefrom and outputting them, a first decoder unit for decoding said separated encoded video signal from said demultiplexor unit and outputting it, an expand unit for expanding a decoded signal from said first decoder unit and outputting it, a frame memory unit for storing an output signal from said expand unit, a delay unit for delaying said separated encoded composite differential signal from the demultiplexor unit for a predetermined delay time, a second decoder unit for decoding the differential signal delayed by said delay unit and generating an address for reading a video signal indicative of each of portions of the video stored i n said frame memory unit, other than white video portions, and an adder unit for adding said differential signal decoded by said second decoder unit to said read video signal outputted from the frame memory unit according to said address of the second decoder unit and outputting a decoded video signal.

The second encoder unit comprises an edge detector for detecting information about edges of each of said original video signals, an edge information memory for storing said edge information detected by said edge detector, a Quadtree encoder for generating a control signal for controlling an encoding for each of said differential signals from said adder unit and encoding the edge information in a Quadtree manner, a differential signal encoder for receiving the differential signal from the adder unit via a switch and encoding it, a formatter for multiplexing the edge information encoded by said Quadtree encoder and the differential signal encoded by said differential signal encoder and outputting an encoded composite differential signal, and a threshold calculator for receiving a bit count value obtained by counting the number of bits of said encoded differential signal from the differential signal encoder, varying a threshold for an edge detection, in reversely proportional to said bit count value and sending said varied threshold to the edge detector.

The second decoder unit comprises a demultiplexor for separating said edge information and said differential signal from each of said composite differential signals including the edge information, a Quadtree decoder for decoding said Quadtree-coded edge information from said demultiplexor, an address generator for generating an address for reading a video signal indicative of each of portions of the video stored in said frame memory unit, other than white video portions, based on said edge information decoded in said Quadtree decoder, a switch for permitting outputting of said DPCM-coded differential signal from demultiplexor under a control of the Quadtree decoder, and a differential signal decoder for recovering the differential signal received through the switch.

The encoding/decoding apparatus according to the present invention can be applied to all types of video encoding/decoding system, differently from conventional devices. The encoding/decoding apparatus according to the present invention require only a simple hardware and enable its use with existing encoding/decoding devices in a parallel manner. Accordingly, it is applicable to most technical fields utilizing the video compression. For example, the apparatus can be applied to the MPEG standard having a bit rate of 1.15 Mbps, at a bandwidth increase of about 5 nbps. The present invention also makes it possible to apply video encoding/decoding devices of the NTSC grade to the bandwidth of the HDTV grade. This provides an effect of maintaining the compatibility with the lower-grade format.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 3:
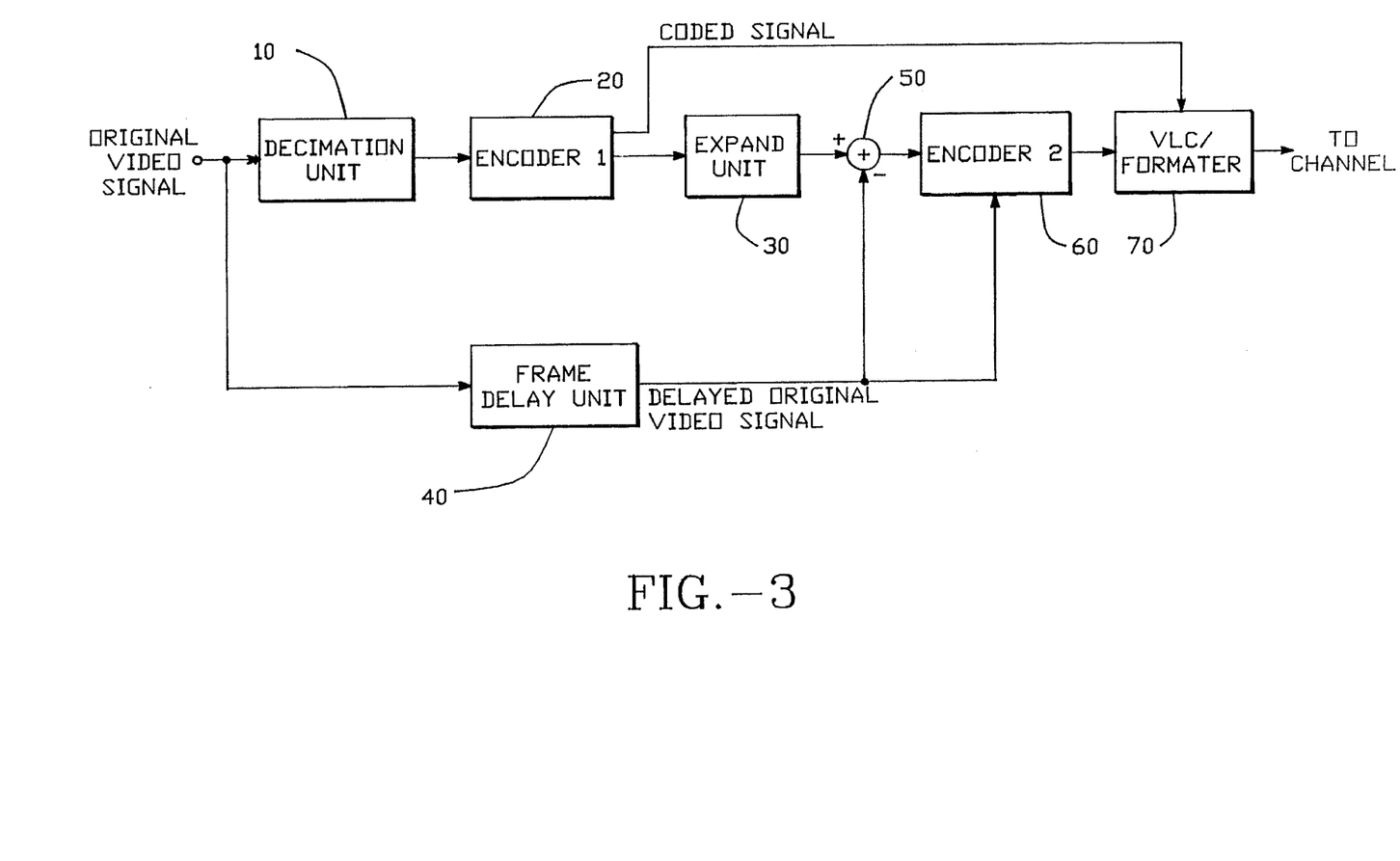
FIG. 3 is a block diagram of a device for compression-encoding video signals according to the present invention.

FIG. 3 is a block diagram of a device for compression-encoding video signals according to the present invention.

As shown in FIG. 3, the compression encoding device comprises a decimation unit 10 for reducing the size of an original digital video signal in a sub-sampling manner, a first encoder unit 20 for encoding a signal sub-sampled by the decimation unit 10 to video information proper to a limited bandwidth of a recording medium or a transmitting medium, and an expand unit 30 for expanding a signal from the first encoder unit 20 up to the size of the original video signal, in reversely proportional to the reduction achieved by the decimation unit 10. A delay unit 40 is also provided, which is adapted to delay the original digital video signal for a predetermined time during which the original video signal is processed through the decimation unit 10, the first encoder unit 20 and the expand unit 30. The compression encoding device also comprises an adder unit 50 for calculating a difference between an expanded signal from the expand unit 30 and the original video signal delayed by the delay unit 40, a second encoder unit 60 for encoding a signal from the adder unit 50 indicative of the difference, namely, a differential signal, and a VLC/formatter unit 70 for encoding a signal from the second encoder unit 60 in a variable length coding and formatting it to send the resulting signal to a channel of a transmitting medium or a recording medium.

Figure 5:
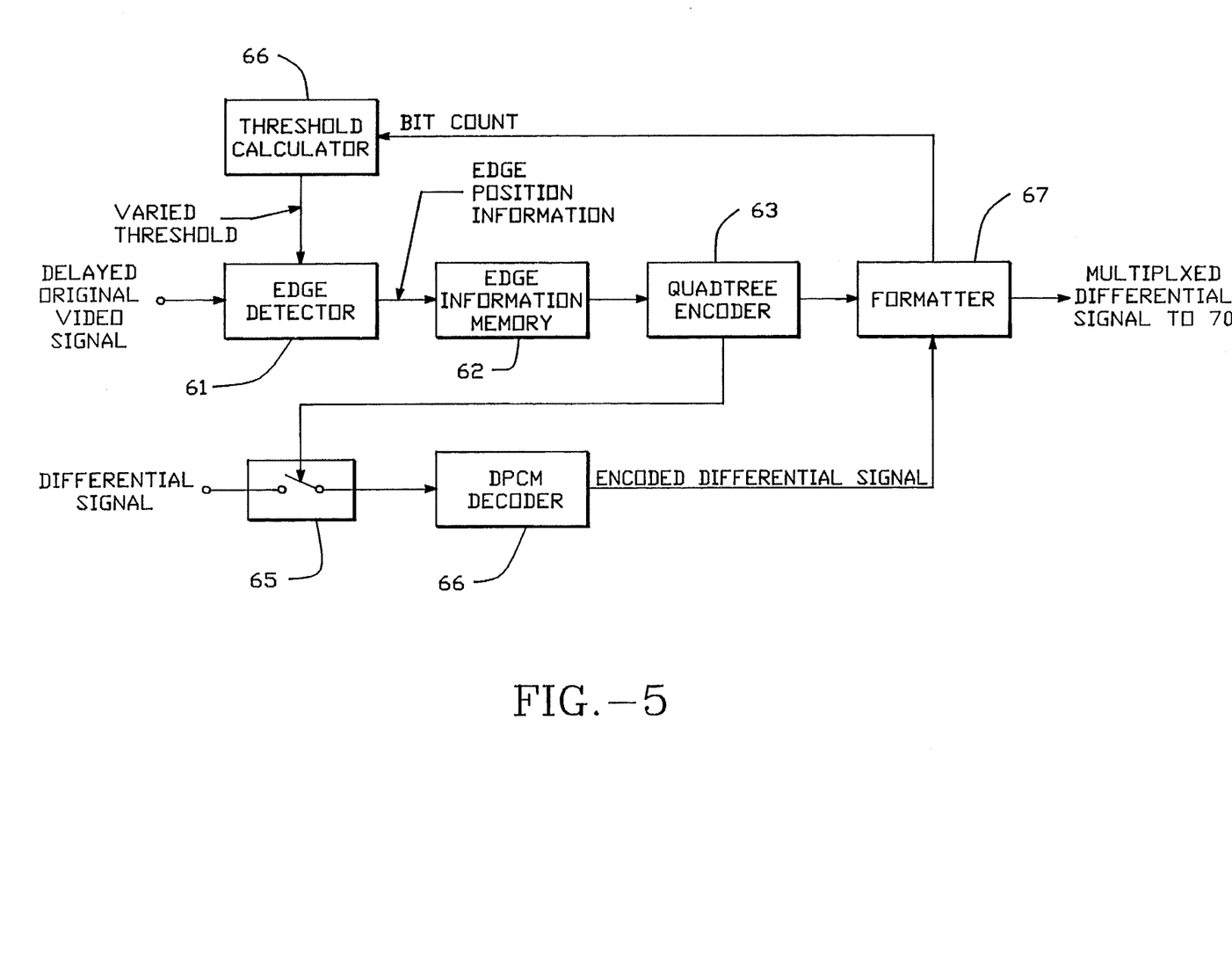
FIG. 5 is a block diagram of a second encoder unit included in the device shown in FIG. 3.

As shown in FIG. 5, the second encoder unit 60 comprises an edge detector 61 for detecting information about edges of the original video signal and an edge information memory 62 for storing the edge information, indicative of the number of edges and each edge position, detected by the edge detector 61. A Quadtree encoder 63 is also provided, which is adapted to generate a control signal for controlling an encoding for the differential signal from the adder unit 50 and encoding the edge information in a Quadtree manner. The second encoder unit 60 also comprises a differential signal encoder 66 for receiving the differential signal from the adder unit 50 via a switch 65 according to the control signal when the number of detected edges is not less than a predetermined reference value and encoding the received differential signal, a formatter 67 for multiplexing the edge information encoded by the Quadtree encoder 63 and the differential signal encoded by the differential signal encoder 66 and outputting an encoded composite differential signal, and a threshold calculator 64 for receiving a bit count value obtained by counting the number of bits of the encoded differential signal from the differential signal encoder 66, varying a threshold for an edge detection, in reversely proportional to the bit count value and sending the varied threshold to the edge detector 61. In the illustrated case, the differential signal encoder 66 is a differential pulse coded modulation (DPCM) encoder and so will be referred to as the DPCM encoder.

Figure 4:
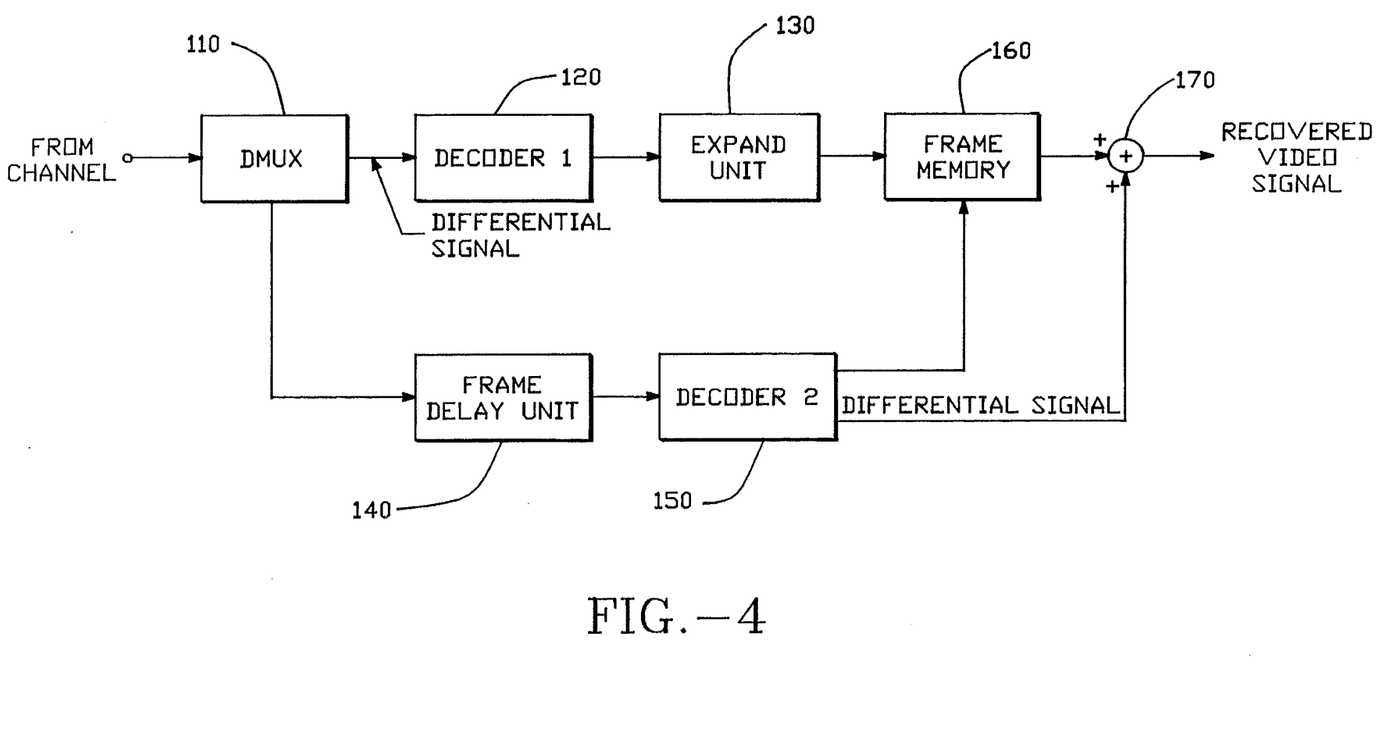
FIG. 4 is a block diagram of a device for decoding compressed video signals in accordance with the present invention.

On the other hand, FIG. 4 is a block diagram of a device for decoding compressed video signals in accordance with the present invention.

As shown in FIG. 4, the decoding device comprises a demultiplexor unit 110 for receiving encoded video signal from the channel of the encoding device of FIG. 3 and demultiplexing it to output the video signal and the composite differential signal separated from each other, a first decoder unit 120 for decoding the encoded video signal from the demultiplexor unit 110 and outputting it, an expand unit 130 for expanding a decoded signal from the first decoder unit 120 and outputting it, and a frame memory unit 160 for storing an output signal from the expand unit 130 therein. A delay unit 140 is also provided, which is adapted to delay the encoded composite differential signal from the demultiplexor unit 110 for a predetermined delay time. The decoding device also comprises a second decoder unit 150 for decoding the differential signal delayed by the delay unit 140 and generating an address for reading a video signal indicative of a portion of the video stored in the frame memory unit 160, other than white video portions, and an adder unit 170 for adding the differential signal decoded by the second decoder unit 150 to the video signal outputted from the frame memory unit 160 according to the address of the second decoder unit 150 and outputting a decoded video signal.

Figure 6:
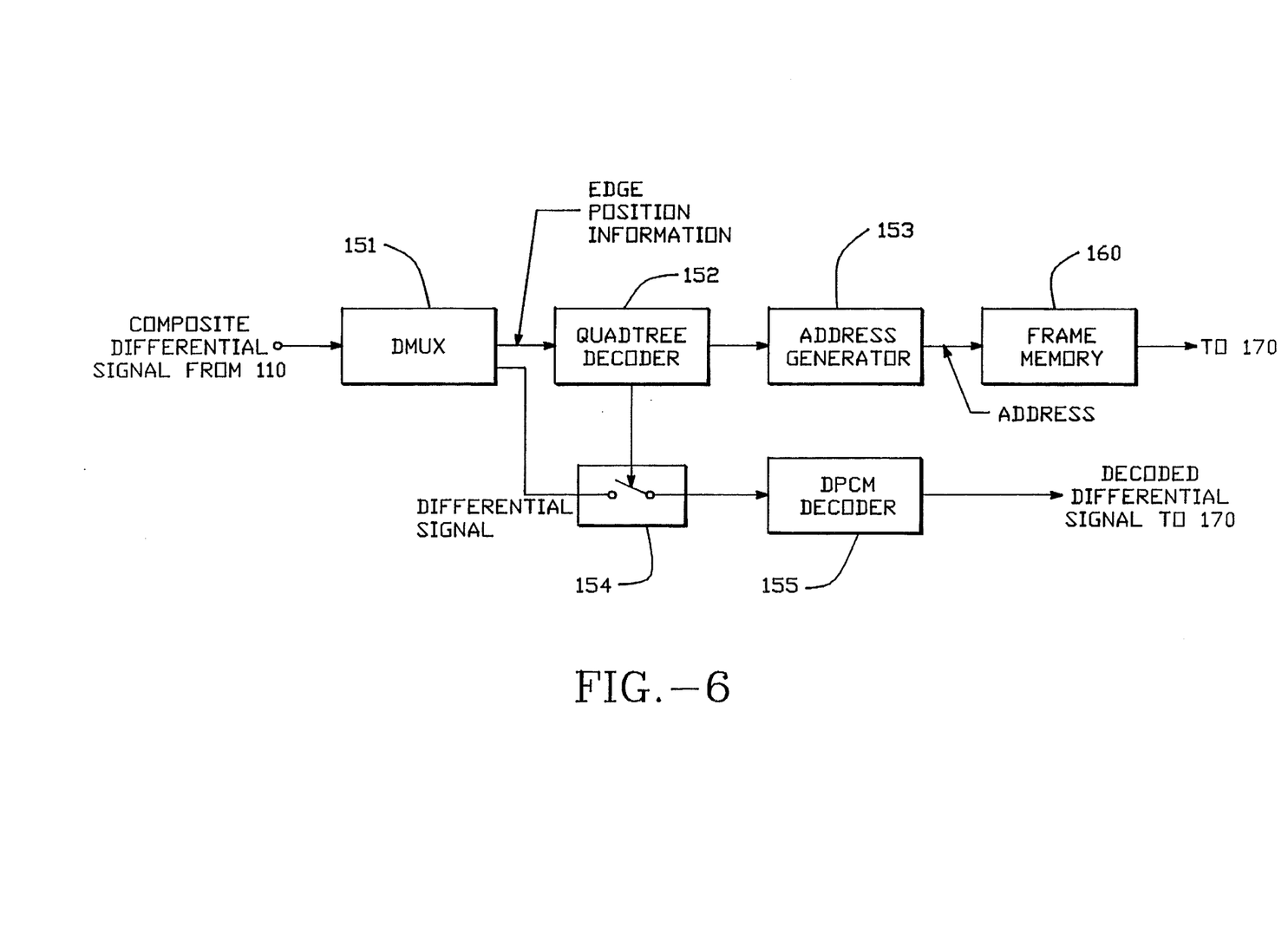
FIG. 6 is a block diagram of a second decoder unit included in the device shown in FIG. 4.

FIG. 6 is a block diagram of the second decoder unit 150 shown in FIG. 4. As shown in FIG. 6, the second decoder unit 150 comprises a demultiplexor 151 for separating the edge information and the differential signal from the composite differential signal including the edge information, a Quadtree decoder 152 for decoding the Quadtree-coded edge information from the demultiplexor 151, and an address generator 153 for generating an address for reading a video signal indicative of a portion of the video stored in the frame memory unit 160, other than white video portions. A switch 154 is also provided, which permits outputting of the DPCH-coded differential signal from demultiplexor 151 under a control of the Quadtree decoder 152. The second decoder unit 150 also comprises a differential signal decoder 155 for recovering the differential signal received through the switch 154. In the illustrated case, the differential signal decoder 155 is a DPCM decoder and so will be referred to as the DPCM decoder.

Now, operations of the devices according to the present invention will be described, in conjunction with FIGS. 3 to 7.

When an original digital video signal is received in the encoding device shown in FIG. 3, it is subjected to a sub-sampling process by the decimation unit 10 so that its size is reduced. The size-reduced signal is compression-encoded in the first encoder unit 20 and then expanded in the expand unit 30. The resulting expanded signal is applied to the adder unit 50 which also receives the original video signal delayed one frame by the delay unit 40. In the adder unit 50, a differential signal indicative of the difference between the expanded signal and the delayed original video signal. The differential signal is encoded in the second encoder unit 60. The differential signal encoded by the second encoder unit 60 and the signal encoded by the first encoder unit 20 are compression-formatted in a variable length coding manner, in the VLC/formatter unit 70 from which the resulting signal is sent to a channel of a transmitting medium or a recording medium.

The operation of the second encoder unit 60 will now be described in detail, in conjunction with FIG. 5. The edge detector 61 finds edge information about the original video, so as to encode fine information of the original video. As the edge detector 61, a sobel edge detector is used, which has an advantageous robustness for noise. The edge detector 61 detects edges of the original video, based on a threshold received from the threshold calculator 64 and outputs position information therefor. This position information about the detected edges outputted from the edge detector 61 is stored in the edge information memory 62. The edge position information stored in the edge information memory 62 is sent to the Quadtree encoder 63 in which it is encoded by video portions.

That is, the Quadtree encoder 63 partitions continuously the video into four blocks until the video is partitioned into blocks of the minimum size. The partition operation of the Quadtree encoder 63 is repeated according to the edge information about the video. The condition for partitioning the video into four blocks will now be described.

When the number of edge information in an optional block from the same-sized blocks obtained by partitioning the video is less than a first predetermined threshold t-black, it is determined that the block has no fine information. In this case, the switch 65 is switched to its OFF state and prevents the differential signal from passing therethrough. When the number of edge information in the block is more than a second predetermined threshold t-white, it is determined that the block has sufficient fine information. In this case, the switch 65 is switched to its ON state so that all pixels for the block is encoded in a DPCM manner, by the DPCM encoder 66.

On the other hand, when the number of edge information is not less than the first predetermined threshold t-black, but not more than the second predetermined threshold t-white, it is determined that the block has more or less edge information. In this case, the block is partitioned into four blocks, each of which will be repeatedly subjected to the above process.

The two thresholds t-black and t-white needed in the Quadtree encoder 63 are defined in the following manner.

Assuming that one video block has a longitudinal length X and a lateral length Y and the number of Quadtree levels is four, the size of the first Quadtree level is X * Y, the size of the second Quadtree level is (X/2) * (Y/2), the size of the third Quadtree level is (X/4) * (Y/4), and and the size of the fourth Quadtree level is (X/8) * (Y/8). That is, each lower level size is reduced in the number of pixels at a rate of ¼, as compared with the just higher level size. Accordingly, it is required to adjust the thresholds so that they meet the reduction rate.

For example, when the thresholds t-black and t-white of the first Quadtree level are $t_1$ and $t_2$, respectively, the thresholds at the second Quadtree level become $t_1/4$ and $t_2/4$, the thresholds at the second Quadtree level become $t_1/16$ and $t_2/16$, and the thresholds at the second Quadtree level become $t_1/64$ and $t_2/64$.

When the Quadtree encoder 63 determines that a sufficient amount of white portions, namely, fine information are present in a block of a certain level, it sends a control signal to the switch 65, so as to switch the switch 65 to its ON state. Accordingly, the DPCM encoder 66 encodes respective differential signals from all pixels in the blocks determined to have a sufficient amount of fine information, in the DPCM coding manner.

As the DPCM coding method, a nonlinear quantization method is used, in accordance with the present invention. The nonlinear quantization utilizes a test video, to obtain a histogram for a differential signal indicative of a difference between an original video portion corresponding to the white portion of the test video and a video portion obtained by encoding the original video portion and then recovering it. From the obtained histogram, a variance is also calculated. Thereafter, the resulting histogram with Laplacian distribution is subjected to a quantization, so as to obtain quantized levels. These quantized levels are stored to form a table which includes the quantized levels classified into a plurality of groups. The t, able is used upon the DPCN encoding operation.

Thereafter, the edge position information signal Quadtree-encoded in the Quadtree encoder 63 and the differential signal DPCM-encoded in the DPCM encoder 66 are multiplexed by the formatter 67 in the following manner.

Figure 7:
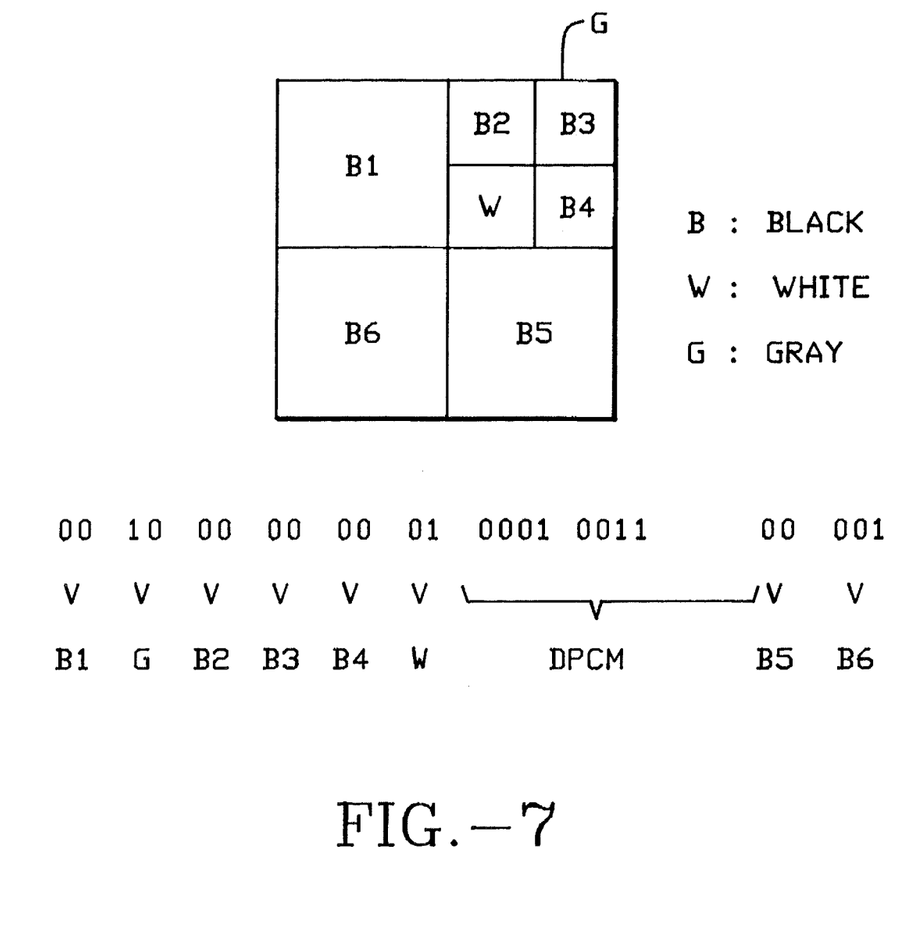
FIG. 7 is a schematic view explaining a Quadtree encoding in accordance with the present invention.

For example, assuming that '00', '01' and '10' are Quadtree codes for a black block B, a white block W and a gray block G, respectively, a video shown in FIG. 7 is scanned from its left uppermost end, in clockwise. By the scanning, the black portion B, and the gray portion G are encoded to '00' and '10', respectively. The gray portion G is also partitioned into four blocks which are, in turn, scanned from the left uppermost end, in clockwise. The white portion W is encoded to '01'. A differential signal of each pixel in the white portion W is DPCM-encoded. The white portion W is a block determined to have the number of edges not less than a predetermined threshold, that is, a large amount of fine information.

In this case, the DPCM codes are assumed to be of four bits. Also, the Quadtree-encoding direction is assumed to be clockwise. That is, the encoding is carried out in a recursive manner, according to the order of the left upper block, the right upper block, the right lower block, and the left lower block.

At this time, the formatter 67 counts the number of bits of the encoded differential signal from the DPCM encoder 66 and then send a bit count signal to the threshold calculator 64 which, in turn, varies the threshold for the edge detection, in reversely proportional to the bit count value.

This operation will now be described in detail.

The amount of bits encoded by the second encoder unit 60 of FIG. 5 is not varied, depending on the kind of frame (that is, an intraframe coding or an interframe coding). It is fixed for frames to meet a target rate.

For example, when the target rate and the frame rate are a bits/sec and 30 Hz, respectively, the number of bits allocated in each frame is a/30 bits. This bit number can be controlled, using the edge detector 61 of FIG. 5.

That is, as the amount of edge information is control led by varying the threshold for the edge detection, the number of allocated bits. However, this method is difficult to meet the number of allocated bits precisely.

Where the number of bits of a differential signal encoded in the above-mentioned manner is less than the number of allocated bits, it is stuffed with dummy bits corresponding to the shortage of bits. On the other hand, when the number of bits of the differential signal is less than the number of allocated bits, the surplus bits are cut off.

The threshold calculator 64 calculates thresholds for next frame, based on the bit count value obtained by continuously counting the number of encoded bits in the present frame. Such a calculation can be expressed by the following equations:

$$T_{n+1} = \begin{bmatrix} T_n + \alpha, & \text{if } N_n > a/30 \\ T_n, & \text{if } N_n = a/30 \\ T_n - \alpha, & \text{if } N_n < a/30 \end{bmatrix}$$

wherein, $T_n$ represents a threshold for edge in the n-th frame, $T_{n+1}$ represents a threshold for edge in the n+1-th frame, and $N_n$ represents the number of bits for the n-th frame. That is, a predetermined value α is added to or deducted from the threshold, depending on the number of bits $N_n$.

Accordingly, the edge detector 61 detects edge information of the video, based on the varied threshold. The edge information is encoded in the Quadtree encoder 63. For the white portion determined to have a large amount of fine information, its differential signal is DPCM-encoded in the DPCM encoder 66. These Quadtree-encoded edge position information and DPCM-encoded differential signal are multiplexed in the formatter 67, to produce encoded composite differential signal, as shown in FIG. 7.

This encoded composite differential signal from the second encoder unit 60 is received in the VLC/formatter unit 70 which also receives the encoded video signal from the first encoder unit 20. The VLC/formatter unit 70 formats the received video signal and composite differential signal in a variable length coding manner and sends the resulting output signal to the channel of the transmitting medium or recording medium.

On the other hand, where such a signal encoded in the above-mentioned encoding device and then transmitted via the transmitting medium is to be received and processed or where a signal encoded in the same manner as mentioned above and then recorded on the recording medium is to be played back, the encoded signal should be subjected to a decoding process. This is achieved by the decoding device shown in FIGS. 4 and 6, so as to recover the original video signal.

Now, the decoding operation of the decoding device will be described.

When the encoded video signal is received in the decoding device, it is subjected to a demultiplexing process in the demultiplexor unit 110, so that it is separated into the encoded video signal and the encoded composite differential signal. The separated composite video signal is decoded in the first decoder unit 120 and then expanded in the expand unit 130. The resulting signal from the expand unit 130 is then stored in the frame memory unit 160. On the other hand, the separated composite differential signal is delayed by the delay unit, 140 for a delay time corresponding to the total signal processing time of the first decoder unit 120 and the expand unit 130. The differential signal from the composite differential signal delayed by the delay unit 140 is decoded in the second decoder unit, 150 which, in turn, generates a read address for the frame memory unit 160, based on the edge position information on video portions other than the video portion including the differential signal. Accordingly, the decoded video signal in the frame memory unit 160 corresponding to the address designated by the second decoder unit 150 is added to the decoded differential signal outputted from the second decoder unit, 150, in t,he adder unit 170 which, in turn, outputs a decoded video signal.

The decoding operation of the second decoder unit 150 will now be described, in conjunction with FIG. 6.

First, the separated composite differential signal from the demultiplexor unit, 110 is received in the demultiplexor 151 which, in turn, separates the composite differential signal into the edge information and the differential signal. The edge information is decoded in the Quadtree decoder 152. The Quadtree decoder 152 sends the decoded edge information to the address generator 153. When the Quadtree decoder 152 receives information '01' indicative of a white video portion, it controls the switch 154 to be switched to its ON state, so that the separated differential signal from the demultiplexor 151 is inputted at the DPCM decoder 155. As a result, the address generator 153 generates the address for reading a signal corresponding to a video portion other than white video portions, so as to enable an access to the frame memory unit 160. The DPCM decoder 155 recovers the differential signal for each white video portion and then outputs it.

In the adder unit 170, the differential signal recovered in the second decoder unit 150 is added to the video signal indicative of the video portion other than white video portion and outputted from the frame memory unit 160 according to the address from the second decoder unit 150. As a result, the adder unit 170 outputs the recovered video signal.

As apparent from the above description, the encoding/decoding devices according to the present invention can be applied to all types of video encoding/decoding system. Conventional devices is impossible to achieve such an application. Where the bandwidth of a channel or a recording medium, the present invention makes it possible to minimize variations in existing video encoding/decoding devices and to fabricate video encoding/decoding devices with a new bandwidth in a short time.

The encoding/decoding devices according to the present invention require only a simple hardware and enable its use with existing encoding/decoding devices in a parallel manner. Accordingly, they are applicable to most technical fields utilizing the video compression.

In addition, the present invention makes it possible to apply video encoding/decoding devices of the NTSC grade to the bandwidth of the HDTV grade. This provides an effect of minimizing the expenses of the consumers and yet maintaining the compatibility with the lower-grade format.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for compression-encoding and decoding digital video signals comprising:

encoding means for encoding an original digital video signal, said encoding means including, a decimation unit for reducing the size of each of said original digital video signals in a sub-sampling manner;

a first encoder unit for encoding each of signals subsampled by said decimation unit to video information proper to a limited bandwidth of said recording medium or said transmitting medium;

an expand unit for expanding a signal from said first encoder unit up to the size of each original video signal, in reversely proportional to the reduction achieved by the decimation unit;

a frame delay unit for delaying each original video signal for a frame time during which the original video signal is processed through the decimation unit, the first encoder unit and the expand unit;

an adder unit for calculating a difference between each original video signal delayed by said delay unit and each corresponding expanded signal from the expand unit; a second encoder unit for encoding a differential signal from said adder unit; and a VLC/formatter unit for encoding a signal from said second encoder unit in a variable length coding and formatting it to send the resulting signal to a channel of the transmitting medium or the recording medium;

decoding means for decoding each of the encoded original video signals and each corresponding one of the differential signals encoded in said encoding means and then received via a transmitting medium or played back from a recording medium, reading video signals, indicative of video portions including no differential signal, from video signals resulting from said decoding of the encoded original video signals, based on the edge information, adding each of the differential signals to each corresponding one of said read video signals, and outputting recovered video signals.

2. An apparatus in accordance with claim 1, wherein said second encoder unit comprises:

an edge detector for detecting information about edges of each of said original video signals;

an edge information memory for storing said edge information detected by said edge detector;

a Quadtree encoder for generating a control signal for controlling an encoding for each of said differential signals from said adder unit and encoding the edge information in a Quadtree manner;

a differential signal encoder for receiving the differential signal from the adder unit via a switch and encoding it;

a formatter for multiplexing the edge information encoded by said Quadtree encoder and the differential signal encoded by said differential signal encoder and outputting an encoded composite differential signal; and a threshold calculator for receiving a bit count value obtained by counting the number of bits of said encoded differential signal from the differential signal encoder, varying a threshold for an edge detection, in reversely proportional to said bit count value and sending said varied threshold to the edge detector.

3. An apparatus in accordance with claim 2, wherein said Quadtree encoder partitions continuously the video into four blocks until the video is partitioned into blocks of the minimum size, said partition operation being carried out in a recursive manner, according to the edge information about the video.

4. An apparatus in accordance with claim 2, wherein said differential signal encoder encodes ones, included in portions of the video determined to include a large amount of fine information, from said differential signals indicative of a difference between each portion of said original video and a corresponding video portion encoded and then recovered, in a differential pulse coded modulation (DPCM) manner.

5. An apparatus for compression-encoding and decoding digital video signals comprising:

encoding means for encoding an original digital video in a sampling manner to produce encoded original video signals, encoding a differential signal indicative of a difference between each of said original video signals and a signal obtained by expanding each corresponding one of said encoded original video signals, together with edge information, to produce an encoded composite differential signal, adding said encoded composite differential signal to the encoded original video signal, and outputting the resulting signal; and decoding means for decoding each of the encoded original video signals and each corresponding one of the differential signals encoded in said encoding means and then received via a transmitting medium or played back from a recording medium, reading video signals, indicative of video portions including no differential signal, from video signals resulting from said decoding of the encoded original video signals, based on the edge information, adding each of the differential signals to each corresponding one of said read video signals, and outputting recovered video signals, said decoding means including, a demultiplexor unit for receiving each of said encoded video signals from said encoding means via said transmitting medium or said recording medium, demultiplexing it to separate each corresponding composite differential signal therefrom and outputting them;

a first decoder unit for decoding said separated encoded video signal from said demultiplexor unit and outputting it;

an expand unit for expanding a decoded signal from said first decoder unit and outputting it;

a frame memory unit for storing an output signal from said expand unit;

a frame delay unit for delaying said separated encoded composite differential signal from the demultiplexor unit for a frame delay time;

a second decoder unit for decoding the differential signal delayed by said delay unit and generating an address for reading a video signal indicative of each of portions of the video stored in said frame memory unit, other than white video portions; and an adder unit for adding said differential signal decoded by said second decoder unit to said read video signal outputted from the frame memory unit according to said address of the second decoder unit and outputting a decoded video signal.

6. An apparatus in accordance with claim 5, wherein said second decoder unit comprises:

a demultiplexor for separating said edge information and said differential signal from each of said composite differential signals including the edge information;

a Quadtree decoder for decoding said Quadtree-coded edge information from said demultiplexor;

an address generator for generating an address for reading a video signal indicative of each of portions of the video stored in said frame memory unit, other than white video portions, based on said edge information decoded in said Quadtree decoder;

a switch for permitting outputting of said DPCM-coded differential signal from demultiplexor under a control of the Quadtree decoder; and a differential signal decoder for recovering the differential signal received through the switch.

7. An apparatus in accordance with claim 6, wherein said differential signal decoder decodes ones, included in portions of the video determined to include a large amount of fine information, from said differential signals indicative of a difference between each portion of said original video and a corresponding video portion encoded and then recovered, in a differential pulse coded modulation (DPCM) manner.

8. An apparatus including encoding means for encoding original digital video signals to form encoded signals for a medium having a limited bandwidth where the encoded signals from the medium for decoding to form decoded digital video signals as of representations of the original digital video signals:

encoding means for encoding said original digital video signals, said encoding means including, a decimation unit performing a reduction by sub-sampling to reduce the size of the original digital video signals by sub-sampling to form sub-sampled signals;

a first encoder unit for encoding said sub-sampled signals to form encoded sub-sampled signals having a bandwidth that does not exceed the limited bandwidth of said medium;

an expand unit performing an expansion, inversely proportional to the reduction of said decimation unit, for expanding said encoded sub-sampled signals to the size of the original digital video signals to form expanded signals delayed by one frame time, a frame delay unit for delaying the original digital video signals for one frame time to form frame delayed signals, an adder unit for calculating a difference between the frame delayed signals and the expanded signals to form difference signals;

a second encoder unit for encoding the difference signals to form encoded difference signals;

a VLC/formatter unit for encoding said encoded difference signals and said encoded subsampled signals in a variable length code and for formatting said variable length code to form said encoded signals for said medium, said encoded signals having respective difference signal components and subsampled components.

9. An apparatus in accordance with claim 8, wherein said apparatus includes decoding means for decoding encoded signals received from said medium, said decoding means including:

a demultiplexor unit receiving said encoded signals from said medium, for demultiplexing said encoded signals into demultiplexed difference signal components and said demultiplexed subsampled components, a first decoder unit for decoding said demultiplexed subsampled components to form decoded subsampled segments, an expand unit for expanding said subsampled signals from said first decoder unit to for decoded expended signals, a frame memory unit for storing the decoded expanded signals from said expand unit;

a delay unit for delaying said demultiplexed difference signal components from the demultiplexor unit for a frame delay time to form a frame-delayed difference signal;

a second decoder unit for decoding the frame-delayed difference signals and generating addresses for reading decoded expanded signals from said frame memory, an adder unit for adding said frame-delayed difference signal and decoded expanded signals from the frame memory unit according to said address of the second decoder unit to form said decoded digital video signals.

* * * * *